United States Patent
Wang et al.

(10) Patent No.: US 9,974,081 B2
(45) Date of Patent: May 15, 2018

(54) METHOD OF POWER ALLOCATION AND BASE STATION USING THE SAME

(71) Applicant: National Tsing Hua University, Hsinchu (TW)

(72) Inventors: Chin-Liang Wang, Hsinchu (TW); Jyun-Yu Chen, New Taipei (TW); Yi-Jhen Chen, Tainan (TW)

(73) Assignee: National Tsing Hua University, Hsinchu (TW)

( * ) Notice: Subject to any disclaimer, the term of this patent is extended or adjusted under 35 U.S.C. 154(b) by 0 days. days.

(21) Appl. No.: 15/256,110

(22) Filed: Sep. 2, 2016

(65) Prior Publication Data

US 2018/0042021 A1 Feb. 8, 2018

(30) Foreign Application Priority Data

Aug. 5, 2016 (TW) .............................. 105124901 A

(51) Int. Cl.
*H04W 72/04* (2009.01)
*H04W 52/04* (2009.01)
*H04W 88/08* (2009.01)

(52) U.S. Cl.
CPC ....... *H04W 72/0473* (2013.01); *H04W 52/04* (2013.01); *H04W 88/08* (2013.01)

(58) Field of Classification Search
CPC .............................. H04W 72/04; H04W 52/04
See application file for complete search history.

(56) References Cited

U.S. PATENT DOCUMENTS

2014/0314006 A1* 10/2014 Suh ...................... H04B 7/0452
370/329
2016/0119941 A1* 4/2016 Ko ........................ H04W 52/04
455/453

(Continued)

FOREIGN PATENT DOCUMENTS

| CN | 104640220 | 5/2015 |
|---|---|---|
| CN | 105337651 | 2/2016 |
| TW | 201012105 | 3/2010 |

OTHER PUBLICATIONS

Soumendra Nath Datta, et al., "Optimal power allocation and users selection in non-orthogonal multiple access systems," Wireless Communications and Networking Conference (WCNC), 2016 IEEE, Apr. 3-6, 2016, pp. 1-6.

(Continued)

*Primary Examiner* — Xavier Szewai Wong
(74) *Attorney, Agent, or Firm* — J.C. Patents

(57) ABSTRACT

The disclosure proposes a method of power allocation and a base station using the method. The method is applicable to a base station for transmitting information signals to at least two user equipments in a non-orthogonal multiple access (NOMA) system. The method includes: setting a first transmit power of a first user equipment to be smaller than a second transmit power of a second user equipment, where a channel gain of the first user equipment is larger than that of the second user equipment; calculating a first system capacity of the first user equipment according to the first transmit power, and calculating a second system capacity of the second user equipment according to the second transmit power; summing the first system capacity and the second system capacity to obtain a sum capacity; and calculating the first transmit power and the second transmit power based on maximizing the sum capacity.

12 Claims, 4 Drawing Sheets

(56) References Cited

U.S. PATENT DOCUMENTS

2017/0033901 A1* 2/2017 Tavildar ............... H04L 5/0035
2017/0238261 A1* 8/2017 Benjebbour ........ H04W 52/143
                                                          370/329

OTHER PUBLICATIONS

"Office Action of Taiwan Counterpart Application," dated May 24, 2017, p. 1-p. 6.

Li et al., "5G Network Capacity: Key elements and technologies," IEEE vehicular technology magazine, Jan. 2014, pp. 71-78.

Benjebbour et al., "Concept and Practical Considerations of Non-orthogonal Multiple Access (NOMA) for Future Radio Access," 2013 International Symposium on Intelligent Signal Processing and Communications Systems (ISPACS), Nov. 2013, pp. 770-774.

Saito et al, "System-Level Performance Evaluation of Downlink Non-orthogonal Multiple Access (NOMA)," 2013 IEEE 24th International Symposium on Personal, Indoor and Mobile Radio Communications: Fundamentals and PHY Track, Sep. 2013, pp. 611-615.

Wang et al., "Comparison of orthogonal and non-orthogonal approaches to future wireless cellular systems," IEEE Vehicular Technology Magazine, Sep. 2006, pp. 4-11.

Ding et al., "On the Performance of Non-Orthogonal Multiple Access in 5G Systems with Randomly Deployed Users," IEEE Signal Processing Letters, Dec. 2014, pp. 1501-1505.

Kim et al., "Non-orthogonal Multiple Access in a Downlink Multiuser Beamforming System," 2013 IEEE Military Communications Conference, Nov. 2013, pp. 1278-1283.

Sun et al., "On the Ergodic Capacity of MIMO NOMA Systems," IEEE Wireless Communication Letters, Apr. 2015, pp. 405-408.

Timotheou et al., "Fairness for Non-Orthogonal Multiple Access in 5G Systems," IEEE Signal Processing Letters, Oct. 2015, pp. 1647-1651.

Wang et al., "Power Allocation for a Downlink Non-Orthogonal Multiple Access System," IEEE Wireless Communications Letters, Aug. 2016, pp. 1-10.

Yi-Jhen Chen, "Power Allocation for a Downlink Non-Orthogonal Multiple Access System," Master Thesis, National Tsing Hua University, Jul. 2015, pp. 1-39.

* cited by examiner

METHOD OF POWER ALLOCATION AND BASE STATION USING THE SAME

CROSS-REFERENCE TO RELATED APPLICATION

This application claims the priority benefit of Taiwan application serial no. 105124901, filed on Aug. 5, 2016. The entirety of the above-mentioned patent application is hereby incorporated by reference herein and made a part of this specification.

BACKGROUND

Technical Field

The present disclosure relates to a method of power allocation, and more particularly, to a method of power allocation in a downlink non-orthogonal multiple access (NOMA) system and a base station using the method.

Description of Related Art

With advancements in technologies, the NOMA has been emerged as a promising technique in the development for next-generation wireless communication systems due to the significant gains in capacity.

In the NOMA system, the user multiplexing is performed in the power domain. Specifically, information signals of different users may be superposed by an appropriate power allocation at the transmitter (e.g., by using a superposition coding technique), and the multi-user signal may later be separated using the successive interference cancellation (SIC) technique at the receiver. Therefore, different users are able to transmit (or receive) information over the same channel resource (e.g., time and frequency) in the NOMA system.

However, there is lack of ideal evaluation criterion for developing a power allocation algorithm that is suitable for the NOMA system.

Nonetheless, in a multiple-input multiple-output non-orthogonal multiple access (MIMO-NOMA) system with two users, two power allocation algorithms have been proposed to maximize a sum capacity by taking into consideration of a minimum rate requirement of a weak user. One of the algorithms with the optimal performance is a bisection search method (i.e., an iterative algorithm) with high computational complexity, whereas another one of the algorithms is a suboptimal method based on a derived lower bound of the capacity of the weak user to reduce the complexity while still suffering certain loss in performance.

Therefore, the development of the power allocation algorithm with high efficiency and high performance for the NOMA system is still one of the subject matters concerned by person skilled in the art.

SUMMARY

The present disclosure provides a method of power allocation and a base station using the method. The method is applicable to a base station for transmitting information signals to at least two user equipments in an NOMA system. The at least two user equipments include a first user equipment and a second user equipment. The method includes: setting a first transmit power of a first user equipment to be smaller than a second transmit power of a second user equipment, where a channel gain of the first user equipment is larger than a channel gain of the second user equipment; calculating a first system capacity of the first user equipment according to the first transmit power, and calculating a second system capacity of the second user equipment according to the second transmit power; summing the first system capacity and the second system capacity to obtain a sum capacity; and calculating the first transmit power and the second transmit power based on maximizing the sum capacity, where Karush-Kuhn-Tucker (KKT) conditions are adopted to obtain the first transmit power and the second transmit power based on maximizing the sum capacity.

In an embodiment of the disclosure, the step in which the KKT conditions are adopted to obtain the first transmit power and the second transmit power based on maximizing the sum capacity includes: setting the first system capacity to be a first minimum rate requirement, where the first minimum rate requirement is a minimum value to be reached by the first system capacity; calculating a first power allocation factor based on maximizing the sum capacity by adopting the KKT conditions; and calculating the first transmit power and the second transmit power according to the first power allocation factor.

In an embodiment of the disclosure, the KKT conditions include a first parameter and a second parameter, where the step of calculating the first power allocation factor based on maximizing the sum capacity by adopting the KKT conditions further includes: setting the first parameter to be greater than zero, and setting the second parameter to be zero; and calculating the first power allocation factor based on maximizing the sum capacity according to the KKT conditions.

In an embodiment of the disclosure, the method further includes: calculating the first system capacity and the second system capacity according to the first transmit power and the second transmit power; and summing the first system capacity and the second system capacity to obtain a sum capacity.

In an embodiment of the disclosure, the step in which the KKT conditions are adopted to obtain the first transmit power and the second transmit power based on maximizing the sum capacity includes: setting the second system capacity to be a second minimum rate requirement, where the second minimum rate requirement is a minimum value to be reached by the second system capacity; calculating a second power allocation factor based on maximizing the sum capacity by adopting the KKT conditions; and calculating the first transmit power and the second transmit power according to the second power allocation factor.

In an embodiment of the disclosure, the KKT conditions include a first parameter and a second parameter, where the step of calculating the second power allocation factor based on maximizing the sum capacity by adopting the KKT conditions further includes: setting the first parameter to be zero, and setting the second parameter to be greater than zero; and calculating the second power allocation factor based on maximizing the sum capacity according to the KKT conditions.

In an embodiment of the disclosure, the method further includes: calculating the first system capacity and the second system capacity according to the first transmit power and the second transmit power; and summing the first system capacity and the second system capacity to obtain a sum capacity.

The disclosure provides a base station, which is applicable to an NOMA system. The base station includes a transceiver circuit, a storage circuit and a processing circuit. The transceiver circuit is configured to transmit information signals to at least two user equipments. The at least two user equipments include a first user equipment and a second user equipment. The storage unit stores a plurality of program codes. The processing circuit is coupled to the transceiver circuit and the storage circuit, and configured to access the program codes to execute following operations of: setting a first transmit power of a first user equipment to be smaller than a second transmit power of a second user equipment, where a channel gain of the first user equipment is larger than a channel gain of the second user equipment; calculating a first system capacity of the first user equipment according to the first transmit power, and calculating a second system capacity of the second user equipment according to the second transmit power; summing the first system capacity and the second system capacity to obtain a sum capacity; and calculating the first transmit power and the second transmit power based on maximizing the sum capacity, where KKT conditions are adopted to obtain the first transmit power and the second transmit power based on maximizing the sum capacity.

In an embodiment of the disclosure, the processing circuit further accesses the program codes to execute operations of: setting the first system capacity to be a first minimum rate requirement, where the first minimum rate requirement is a minimum value to be reached by the first system capacity; calculating a first power allocation factor based on maximizing the sum capacity by adopting the KKT conditions; and calculating the first transmit power and the second transmit power according to the first power allocation factor.

In an embodiment of the disclosure, the KKT conditions include a first parameter and a second parameter. The processing circuit further accesses the program codes to execute operations of: setting the first parameter to be greater than zero, and setting the second parameter to be zero; and calculating the first power allocation factor based on maximizing the sum capacity according to the KKT conditions.

In an embodiment of the disclosure, the processing circuit further accesses the program codes to execute operations of: calculating the first system capacity and the second system capacity according to the first transmit power and the second transmit power; and summing the first system capacity and the second system capacity to obtain a sum capacity.

In an embodiment of the disclosure, the processing circuit further accesses the program codes to execute operations of: setting the second system capacity to be a second minimum rate requirement, where the second minimum rate requirement is a minimum value to be reached by the second system capacity; calculating a second power allocation factor based on maximizing the sum capacity by adopting the KKT conditions; and calculating the first transmit power and the second transmit power according to the second power allocation factor.

In an embodiment of the disclosure, the KKT conditions include a first parameter and a second parameter. The processing circuit further accesses the program codes to execute operations of: setting the first parameter to be zero, and setting the second parameter to be greater than zero; and calculating the second power allocation factor based on maximizing the sum capacity according to the KKT conditions.

In an embodiment of the disclosure, the processing circuit further accesses the program codes to execute operations of: calculating the first system capacity and the second system capacity according to the first transmit power and the second transmit power; and summing the first system capacity and the second system capacity to obtain a sum capacity.

Based on the above, according to the method of power allocation and the base station using the method in the disclosure, the base station can divide the power allocation for the user equipments into two conditions in response to the requirements of the different user equipments. Both the two conditions can ensure that the system capacity related to one user equipment reaches the minimum rate requirement while maximizing the system capacity of the other user equipment.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
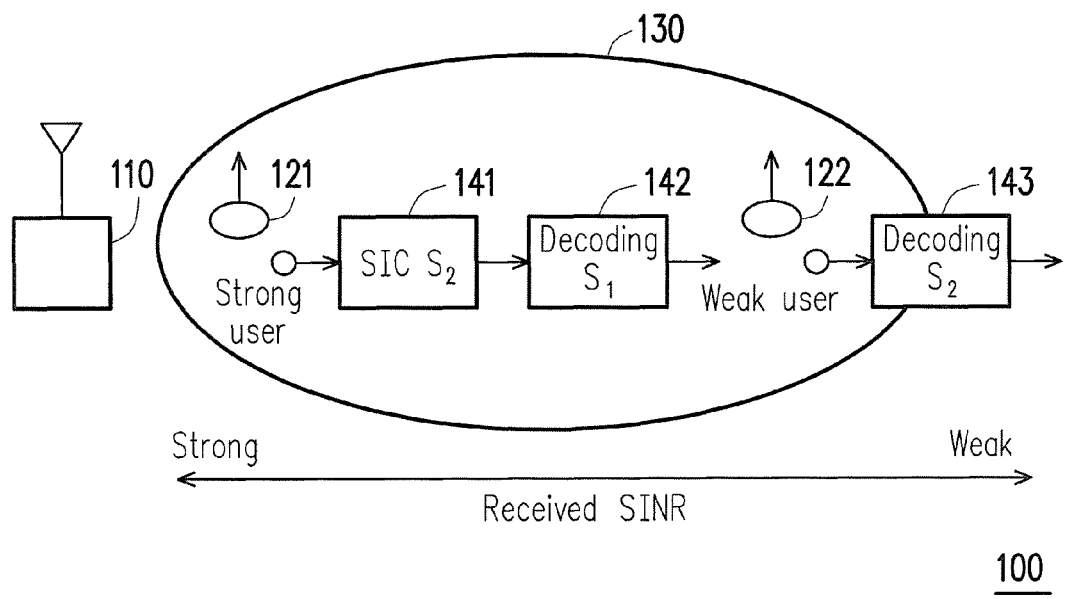
FIG. 1 illustrates a schematic diagram of the SIC technique used by the users at the receiver.

Reference will now be made in detail to the present preferred embodiments of the disclosure, examples of which are illustrated in the accompanying drawings. Wherever possible, the same reference numbers are used in the drawings and the description to refer to the same or like parts.

In the NOMA system, a base station can share the same communication resource (e.g., the time domain or the frequency domain) to each of users on the power domain, so as to effectively improve a spectrum efficiency. Specifically, the base station superposes signals to be transmitted to multiple users by using the superposition coding and transmits a resulting signal. The users may separate the user signal at the receiver by using the SIC technique. Description regarding the SIC technique used in the NOMA system is provided below with reference to FIG. 1.

FIG. 1 illustrates a schematic diagram of the SIC technique used by the users at the receiver. Referring to FIG. 1, it is assumed that a downlink system 100 has a base station 110 and two user equipments 121 and 122, and the user equipments 121 and 122 are located within a coverage 130 of the base station 110. Among them, it is assumed that the user equipment 121 has a larger channel gain and the user equipment 122 has a smaller channel gain.

In the SIC technique, in order to correctly demodulate the signal transmitted by the base station 110 at the receiver (i.e., the user equipments 121 and 122), the base station 110 may perform a power allocation for signals to be transmitted to the user equipments 121 and 122. Among them, the signal of a weak user is allocated with more transmit power, and the signal of a strong user is allocated with less transmit power.

In the present embodiment, the user equipment 121 having the larger channel gain is defined as the strong user and the user equipment 122 having the smaller channel gain is defined as the weak user. Accordingly, the base station 110 allocates more transmit power for the signal of the user equipment 122 and allocates less transmit power for the signal of the user equipment 121. As such, the signal $\hat{x}$ transmitted by the base station 110 to the user equipments 121 and 122 may be written as, for example, Equation (1) below:

$$\hat{x} = \sqrt{P_1} s_1 + \sqrt{P_2} s_2 \quad \text{Equation (1)}$$

where $s_1$ denotes the signal to be transmitted to the user equipment 121 by the base station 110, $s_2$ denotes the signal to be transmitted to the user equipment 122 by the base station 110, and $P_1$ and $P_2$ denote the transmit powers allocated by the base station 110 for the signals $s_1$ and $s_2$, respectively, where the transmit power $P_1$ is less than $P_2$.

Signals $y_1$ and $y_2$ received at the user equipments 121 and 122 may be written as Equations (2) and (3) below, respectively, $$y_1 = h_1 \hat{x} + n_1 = \sqrt{P_1} h_1 s_1 + \sqrt{P_2} h_1 s_2 + n_1 \quad \text{Equation (2)}$$

$$y_2 = h_2 \hat{x} + n_2 = \sqrt{P_1} h_2 s_1 + \sqrt{P_2} h_2 s_2 + n_2 \quad \text{Equation (3)}$$

where $h_1$ denotes a transmission channel between the base station 110 and the user equipment 121, $h_2$ denotes a transmission channel between the base station 110 and the user equipment 122, and $n_1$ and $n_2$ denote noises received by the user equipments 121 and 122, respectively. Note that $n_1$ and $n_2$ are, for example, the additive white Gaussian noise (AWGN) with zero-mean and variance $N_0$, but the disclosure is not limited to the above.

In the SIC technique, if the user equipment 121 is able to perfectly remove interference of the signal $s_2$ from the user equipment 122 by the SIC after receiving the signal $y_1$ (e.g., a block 141 in FIG. 1), the user equipment 121 can then demodulate the signal $s_1$ (e.g., a block 142 in FIG. 1) to be transmitted to the user equipment 121 by the base station 110 without having inference of the signal from the other user. On the other hand, after the signal $y_2$ is received by the user equipment 122, because the base station 110 allocates less transmit power $P_1$ for the signal $s_1$, the user equipment 122 can directly demodulate the signal $s_2$ (e.g., a block 143 in FIG. 1) to be transmitted to the user equipment 122 by the base station 110 with the signal $s_1$ considered as the noise.

After the signals $s_1$ and $s_2$ are successfully demodulated, system capacities of the user equipments 121 and 122 may be written as Equations (4) and (5) below, respectively, $$C_1 = \log_2(1 + P_1 |h_1|^2 / N_0), \quad \text{Equation (4)}$$

$$C_2 = \log_2(1 + P_2 |h_2|^2 / (P_1 |h_2|^2 + N_0)). \quad \text{Equation (5)}$$

It should be noted that, according to Equations (4) and (5), it shows that the system capacities $C_1$ and $C_2$ of the user equipments 121 and 122 are related to the transmit powers $P_1$ and $P_2$. In other words, the power allocation for the signals $s_1$ and $s_2$ can directly affect the system capacities of the user equipments 121 and 122. Therefore, with respect to the system capacities of the user equipments 121 and 122, it is very important to appropriately perform the power allocation for the signals $s_1$ and $s_2$ to be transmitted to the user equipments 121 and 122.

In the embodiments of the disclosure, in order to further improve a sum capacity of the NOMA system, the transmit powers $P_1$ and $P_2$ are allocated for the signals $s_1$ and $s_2$ based on maximizing the sum capacity under constraints of user powers and rate requirements.

In this case, an optimization problem based on maximizing the sum capacity $C_T$ (where $C_T = C_1 + C_2$) may be written as:

$$\max_{\{P_1, P_2\}} C_1 + C_2 \quad \text{Equation (6a)}$$

$$\text{Constraint } P_1 + P_2 = P_T \quad \text{Equation (6b)}$$

$$P_1 > 0, P_2 > 0, P_2 > P_1 \quad \text{Equation (6c)}$$

$$C_1 \geq \tilde{C}_1, C_2 \geq \tilde{C}_2 \quad \text{Equation (6d)}$$

where $P_T$ denotes a total transmit power, $\tilde{C}_1$ denotes a minimum rate requirement of the system capacity $C_1$, and $\tilde{C}_2$ denote a minimum rate requirement of the system capacity $C_2$. Equation (6c) represents the more transmit power $P_2$ allocated to the user equipment 122 having the smaller channel gain and the less transmit power $P_1$ allocated to the user equipment 121 having the larger channel gain according to the NOMA principle, and thus $P_2 > P_1$. Equation (6d) represents the fact that the system capacity of each of the user equipments must achieve the corresponding rate requirement in order to ensure quality of service (QoS) requirements in the NOMA system.

In order to verify the optimization problem based on maximizing the sum capacity $C_T$ may indeed be solved, the embodiments of the disclosure intend to prove that the sum capacity $C_T$ is a strictly increasing function. In the present embodiment, with respect to the total transmit power $P_T$, a power allocation factor $\alpha$ ($0 < \alpha < 1$) is defined between the transmit powers $P_1$ and $P_2$, where $P_1 = \alpha P_T$ and $P_2 = (1-\alpha) P_T$. After substituting the transmit powers $P_1$ and $P_2$ into Equations (4) and (5), the sum capacity $C_T$ may be written as:

$$C_T = C_1 + C_2 = \log_2(1 + f(\alpha)) \quad \text{Equation (7)}$$

where $f(\alpha) = [\alpha P_T(|h_1|^2 N_0 - |h_2|^2 N_0 + P_T |h_1|^2 |h_2|^2) + P_T |h_2|^2 N_0]/(\alpha P_T |h_2|^2 N_0 + N_0^2)$.

According to Equation (7), the optimization problem based on maximizing the sum capacity $C_T$ is equivalent to maximizing $f(\alpha)$ in Equation (7). Accordingly, the optimization problem based on maximizing the sum capacity $C_T$ may be rewritten as:

$$\max_{\alpha} f(\alpha) \quad \text{Equation (8a)}$$

$$\text{Constraint } \mu_1^{-1} \phi_1 \leq \alpha \leq (1 - \mu_2^{-1} \phi_2)/(1 + \phi_2) \quad \text{Equation (8b)}$$

where $\phi_1 = 2^{\tilde{C}_1} - 1$, $\phi_2 = 2^{\tilde{C}_2} - 1$, $\mu_1 = P_T |h_1|^2 / N_0$, $\mu_2 = P_T |h_2|^2 / N_0$. It should be noted that, according to the NOMA principle, an upper bound and a lower bound of Equation (8b) must be less than ½. Therefore, the following two conditions are derived to set $\phi_1$ and $\phi_2$:

$$\phi_1 < (P_T|h_1|^2)/2N_0 \qquad \text{Equation (9)}$$

$$\phi_2 > (P_T|h_2|^2)/(P_T|h_2|^2 + 2N_0). \qquad \text{Equation (10)}$$

Next, the function $f(\alpha)$ is differentiated into the following:

$$D_\alpha f(\alpha) = (P_T N_0^2(|h_1|^2 - |h_2|^2)(P_T|h_2|^2 + N_0))/(\alpha P_T|h_2|^2 N_0 + N_0^2)^2 \qquad \text{Equation (11)}$$

According to Equation (11), because of $|h_1|^2 > |h_2|^2$, a slope of the function $f(\alpha)$ may be derived to be a positive value. In other words, the function $f(\alpha)$ is the strictly increasing function. When $\alpha$ is equal to the upper bound $(1-\mu_2^{-1}\phi_2)/(1+\phi_2)$, a maximum value of the function $f(\alpha)$ may be obtained. This optimal solution of $\alpha$ implies that the amount of power allocated for the weak user's signal transmission just can meet the minimum rate requirement $\tilde{C}_2$, while the remaining power is used for the strong user's signal transmission to maximize the sum capacity. In practical applications, it may also be desirable to maximize the data rate of the weak user while guaranteeing the minimum rate requirement $\tilde{C}_1$ of the strong user. However, the optimal solution for this case could not be derived in a similar way as described above.

In view of the above, the present disclosure proposes a method of power allocation, which is capable of appropriately performing the power allocation for the user equipments 121 and 122 based on maximizing the sum capacity under the constraints of the user power and the rate requirement.

In the present embodiment, the method of power allocation is applicable to the downlink system 100 depicted in FIG. 1. It should be noted that, although FIG. 1 merely illustrates the two user equipments 121 and 122 as an example, the disclosure may be applied to more user equipments. In addition, each of the base station 110 and the user equipments 121 and 122 may be configured with M antennas to form the downlink system 100 of the MIMO-NOMA. M may be any positive integer greater than 1, but the disclosure is not limited thereto. Nonetheless, in the following embodiments, for clarity of the description, issues regarding the power allocation for are discussed based on the base station 110 and the user equipments 121 and 122 being the single-antenna system in the embodiments of the disclosure.

In the present embodiment, the user equipments 121 and 122 may be implemented by (but not limited to), for example, a mobile station, an advanced mobile station (AMS), a server, a user terminal, a desktop computer, a laptop computer, a network computer, a workstation, a personal digital assistant (PDA), a tablet personal computer (tablet PC), a scanner, a phone device, a pager, a camera, a television, a handheld video game device, a music device, a wireless sensor or the like, which are not particularly limited by the disclosure.

The base station 110 may include (but not limited to), for example, an eNB, a home eNB, an advanced base station (ABS), a base transceiver system (BTS), an access point, a home BS, a relay, an intermediate node, an intermediate equipment and/or a satellite-based communication base station, but the implementation of the disclosure is not limited to the above.

Figure 2:
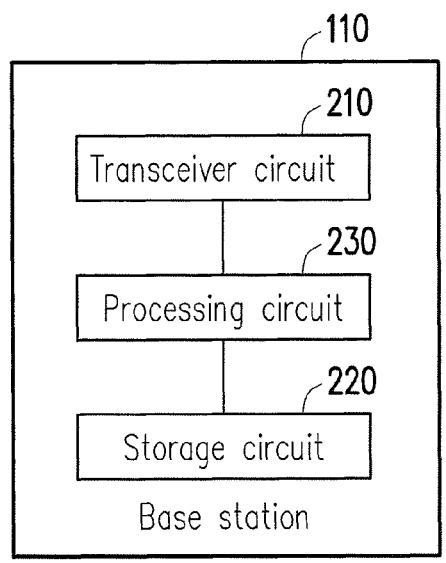
FIG. 2 is a block diagram illustrating a base station according to an embodiment of the disclosure.

In the present embodiment, the base station 110 may at least be represented by function elements depicted in FIG. 2. FIG. 2 is a block diagram illustrating a base station according to an embodiment of the disclosure. The base station 110 may at least include (but not limited to) a transceiver circuit 210, a storage circuit 220 and a processing circuit 230. The transceiver circuit 210 may include a transmitter circuit, an A/D (analog-to-digital) converter, a D/A converter, a low noise amplifier, a mixer, a filter, an impedance matcher, a transmission line, a power amplifier, one or more antenna circuits and a local storage medium element (but the disclosure is not limited thereto), such that the base station 110 can provide wireless transmitting/receiving functions to the user equipments 121 and 122. The storage circuit 220 is, for example, a memory, a hard disk or other elements capable of storing data, and may be configured to store a plurality of program codes.

The processing circuit 230 is coupled to the transceiver circuit 210 and the storage circuit 220, and may be a processor for general purposes, a processor for special purposes, a conventional processor, a digital signal processor, a plurality of microprocessors, one or more microprocessors, controllers and microcontrollers which are combined with a core of the digital signal processor, an application specific integrated circuit (ASIC), a field programmable gate array (FPGA), any other integrated circuits, a state machine, a processor based on advanced RISC machine (ARM) and the like.

Figure 3:
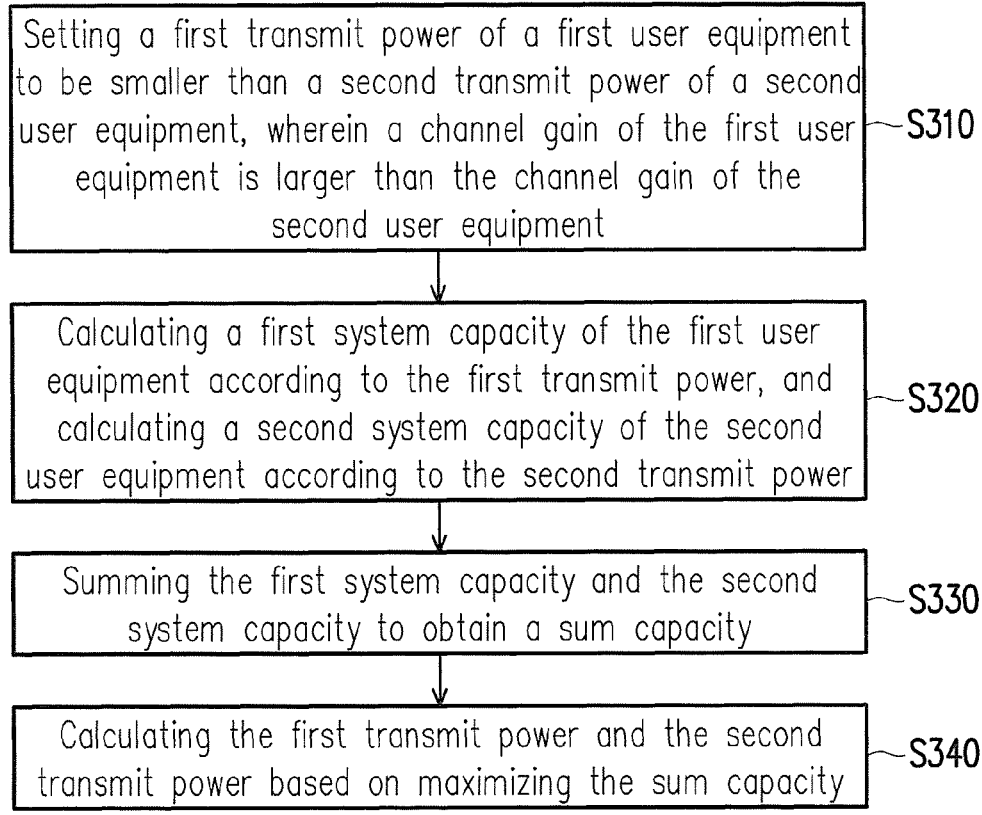
FIG. 3 is a flowchart illustrating a method of power allocation according to an embodiment of the disclosure.

In the present embodiment, the processing circuit 230 can access and execute the program codes stored in the storage circuit 220 in order to perform each step in the method of power allocation proposed in the present disclosure. FIG. 3 is a flowchart illustrating a method of power allocation according to an embodiment of the disclosure. Referring to FIGS. 1 to 3, the method of FIG. 3 may be executed by the base station 110 of FIG. 2, and applicable to the downlink system 100 depicted in FIG. 1. Each step in the method of power allocation of FIG. 3 is described below with reference to each element of the base station 110 in FIG. 2.

In step S310, the processing circuit 230 sets a transmit power $P_1$ of the user equipment 121 to be smaller than a transmit power $P_2$ of the user equipment 122, where a channel gain of the user equipment 121 is larger than a channel gain of the user equipment 122.

In the present embodiment, it is assumed that $h_1$ denotes a transmission channel between the base station 110 and the user equipment 121, and $h_2$ denotes a transmission channel between the base station 110 and the user equipment 122. Also, it is further assumed that the user equipment 121 has a larger channel gain whereas the user equipment 122 has a smaller channel gain (i.e., $|h_1|^2 > |h_2|^2$). In order to correctly demodulate the signals transmitted by the base station 110 at the receiver (i.e., the user equipments 121 and 122) using the SIC technique, the user equipment 122 having the smaller channel gain is allocated with the more transmit power $P_2$ and the user equipment 121 with the larger channel gain is allocated with the less transmit power $P_1$. In this case, the transmit power $P_1$ of the user equipment 121 is smaller than the transmit power $P_2$ of the user equipment (i.e., $P_1 < P_2$).

In step S320, a system capacity $C_1$ of the user equipment 121 is calculated according to the transmit power $P_1$, and a system capacity $C_2$ of the user equipment 122 is calculated according to the transmit power $P_2$. In the present embodiment, expression of the system capacities $C_1$ and $C_2$ may refer to Equations (4) and (5) as mentioned above.

In step S330, the system capacities $C_1$ and $C_2$ are summed to obtain a sum capacity $C_T$ (i.e., $C_T = C_1 + C_2$).

In step S340, the processing circuit 230 calculates the transmit powers $P_1$ and $P_2$ based on maximizing the sum capacity, where Karush-Kuhn-Tucker (KKT) conditions are adopted to obtain the transmit powers $P_1$ and $P_2$ based on maximizing the sum capacity.

In the present embodiment, to achieve the QoS requirements of the two user equipments 121 and 122 in the NOMA system, the transmit powers $P_1$ and $P_2$ are allocated under the constraints of the user power and the rate requirement as set in advance in the optimization problem based on maximizing the sum capacity $C_T$ (where $C_T=C_1+C_2$). The expression regarding the optimization problem based on maximizing the sum capacity $C_T$ (where $C_T=C_1+C_2$) may refer to Equations (8a) and (8b).

Further, in the present embodiment, the transmit powers $P_1$ and $P_2$ based on maximizing the sum capacity are obtained by adopting the KKT conditions. The KKT conditions may be written as:

i) $D_\alpha g(\alpha)+\lambda_1 D_\alpha(\phi_1/\mu_1-\alpha)+\lambda_2 D_\alpha(\alpha-(1/(1+\phi_2))(1-\phi_2/\mu_2))=0$ ii) $(\phi_1/\mu_1-\alpha)\lambda_1=0$ iii) $(\alpha-(1/(1+\phi_2))(1-\phi_2/\mu_2))\lambda_2=0$ iv) $\phi_1/\mu_1-\alpha \leq 0$ v) $\alpha-(1/(1+\phi_2))(1-\phi_2/\mu_2) \leq 0$ vi) $0<\alpha<1/2$ vii) $\lambda_1,\lambda_2 \geq 0$  Equation(12)

where $g(\alpha)=-f(\alpha)\leq 0$, and $\lambda_1$ and $\lambda_2$ are Lagrange multipliers of constraints $C_1 \geq \tilde{C}_1$ and $C_2 \geq \tilde{C}_2$, respectively. The condition i) in Equation (12) may be written as:

$(P_T N_0^2(|h_2|^2-|h_1|^2)(N_0+P_T|h_2|^2))/(\alpha P_T|h_2|^2 N_0+N_0^2)^2 - \lambda_1+\lambda_2=0.$  Equation (13)

With respect to $\lambda_2>0$ and $\lambda_1>0$, the conditions ii) and iii) in Equation (12) must be met to obtain the power allocation factor $\alpha$. If $\lambda_2=0$ is set for the case of $\lambda_1>0$, the power allocation factor $\alpha$ may be obtained from the condition ii) in Equation (12), as shown below:

$\alpha_1^{opt}=(\phi_1 N_0)/(P_T|h_1|^2)=\phi_1/\mu_1.$  Equation(14)

On the other hand, if $\lambda_1=0$ is set for the case of $\lambda_2>0$, the power allocation factor $\alpha$ may be obtained from the condition iii) in Equation (12), as shown below:

$\alpha_2^{opt}=[1/(1+\phi_2)][1-(\phi_2 N_0)/(P_T|h_2|^2)]=[1/(1+\phi_2)][1-\phi_2/\mu_2].$  Equation(15)

It should be noted that the optimization problem [i.e., Equations (8a) and (8b)] for maximizing the sum capacity $C_T$ without the minimum rate requirements but with $P_2>P_1$ has the optimal solution $\alpha$ very close to ½, implying almost equal power allocation for the strong user's and the weak user's signal transmission. This would make the user multiplexing in the power domain not useful. Hence, with the minimum rate requirements, $\alpha \geq \phi_1/\mu_1$ or $[\alpha \leq (1-\phi_2/\mu_2)/(1+\phi_2)]$ must be satisfied to achieve $C_1 \geq \tilde{C}_1$ (or $C_2 \geq \tilde{C}_2$). The optimal $\alpha_1^{opt}$ (or $\alpha_2^{opt}$) can ensure that the capacity of the strong user (or the weak user) always meets the rate requirement $\tilde{C}_1$ (or $\tilde{C}_2$) (i.e., the equality holds). By guaranteeing the minimum rate of one user equipment, such optimal solutions can maximize the rate of the other user equipment.

In other words, when taking into consideration of the powers and the minimum rate requirements of the two user equipments, the optimal power allocation factor $\alpha$ may be different based on the powers and the minimum rate requirements of the user equipments. For instance, for allowing the system capacity $C_1$ to achieve the minimum rate requirement $\tilde{C}_1$ (i.e., $C_1 \geq \tilde{C}_1$), the power allocation factor $\alpha$ must be greater than or equal to $\phi_1/\mu_1$. In contrast, for allowing the system capacity $C_2$ to achieve the minimum rate requirement $\tilde{C}_2$ (i.e., $C_2 \geq \tilde{C}_2$), the power allocation factor $\alpha$ must be less than or equal to $[1/(1+\phi_2)][1-\phi_2/\mu_2]$. Accordingly, $\alpha_1^{opt}$ can ensure that the system capacity $C_1$ of the user equipment 121 meets the minimum rate requirement $\tilde{C}_1$ while maximizing the sum capacity $C_2$ of the user equipment 122, whereas $\alpha_2^{opt}$ can ensure that the system capacity $C_2$ of the user equipment 122 meets the minimum rate requirement $\tilde{C}_2$ while maximizing the subscriber equipment $C_1$ of the user equipment 121.

Hence, two methods may be further developed from step 340 to obtain the transmit powers $P_1$ and $P_2$. In order to describe said two methods, the disclosure further divides step S340 into steps S410 to S430 in FIG. 4 and steps S510 to S530 in FIG. 5.

Figure 4:
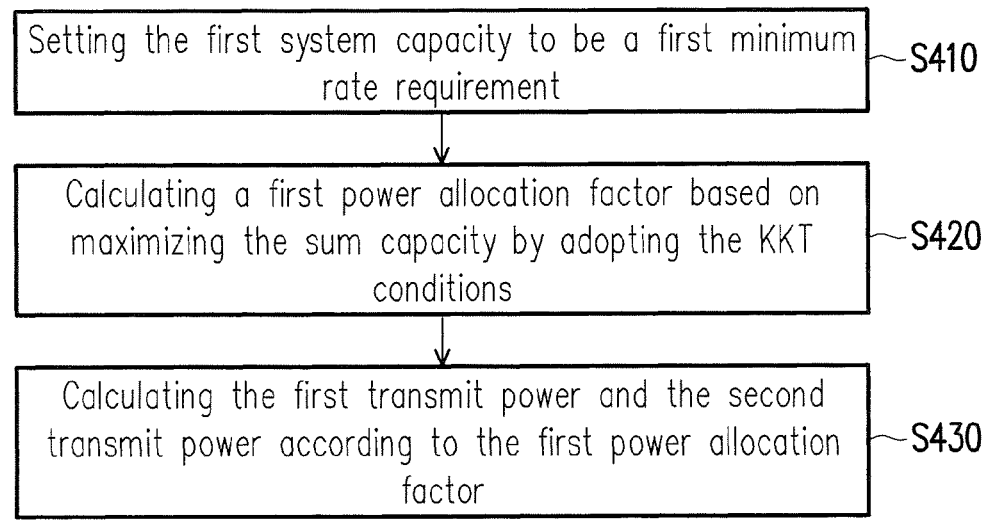
FIG. 4 is a flowchart illustrating the method of power allocation executed by taking a system capacity of a first user equipment as a prime consideration according to an embodiment of the disclosure.

FIG. 4 is a flowchart illustrating the method of power allocation executed by taking a system capacity of the user equipment 121 as a prime consideration according to an embodiment of the disclosure.

In step S410, the processing circuit 230 sets the system capacity $C_1$ to be the minimum rate requirement $\tilde{C}_1$, where the minimum rate requirement $\tilde{C}_1$ is a minimum value to be reached by the system capacity $C_1$.

In step S420, the processing circuit 230 calculates a first power allocation factor $\alpha_1^{opt}$ based on maximizing the sum capacity $C_T$ by adopting the KKT conditions. In the present embodiment, $\lambda_1>0$ and $\lambda_2=0$ are set according to the KKT conditions in Equation (12), so as to calculate the first power allocation factor $\alpha_1^{opt}$ based on maximizing the sum capacity $C_T$. In an embodiment of the disclosure, the first power allocation factor $\alpha_1^{opt}$ may be directly calculated according to Equation (14).

In step S430, the processing circuit 230 calculates the transmit powers $P_1$ and $P_2$ according to the first power allocation factor $\alpha_1^{opt}$. In the present embodiment, because the transmit power $P_1=\alpha_1^{opt}P_T$ and the transmit power $P_2=(1-\alpha_1^{opt})P_T$, the transmit powers $P_1$ and $P_2$ may be calculated separately after the first power allocation factor $\alpha_1^{opt}$ is obtained.

Next, the processing circuit 230 may then obtain the system capacity $C_1$ [based on Equation (4)] and the system capacity $C_2$ [based on Equation (5)] according to the transmit powers $P_1$ and $P_2$, and sum the system capacity $C_1$ and the system capacity $C_2$ to obtain the sum capacity $C_T$.

Figure 5:
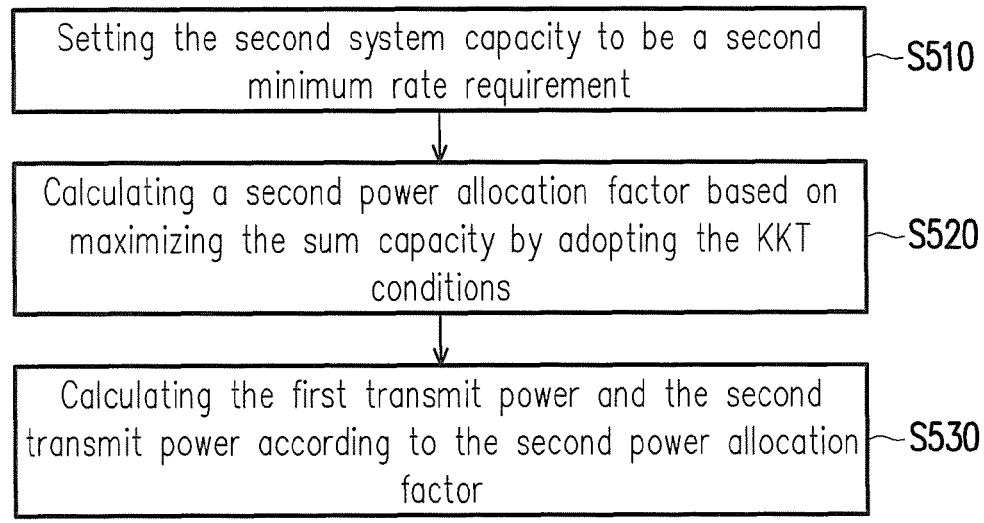
FIG. 5 is a flowchart illustrating the method of power allocation executed by taking a system capacity of a second user equipment as a prime consideration according to an embodiment of the disclosure.

In another embodiment, FIG. 5 is a flowchart illustrating the method of power allocation executed by taking a system capacity of the user equipment 122 as a prime consideration according to an embodiment of the disclosure.

In step S510, the processing circuit 230 sets the system capacity $C_2$ to be the minimum rate requirement $\tilde{C}_2$, where the minimum rate requirement $\tilde{C}_2$ is a minimum value to be reached by the system capacity $C_2$.

In step S520, the processing circuit 230 calculates a second power allocation factor $\alpha_2^{opt}$ based on maximizing the sum capacity $C_T$ by adopting the KKT conditions. In the present embodiment, $\lambda_1=0$ and $\lambda_2>0$ are set according to the KKT conditions in Equation (12), so as to calculate the second power allocation factor $\alpha_2^{opt}$ based on maximizing the sum capacity $C_T$. In an embodiment of the disclosure, the second power allocation factor $\alpha_2^{opt}$ may be directly calculated according to Equation (15).

In step S530, the processing circuit 230 calculates the transmit powers $P_1$ and $P_2$ according to the second power allocation factor $\alpha_2^{opt}$. In the present embodiment, because the transmit power $P_1=\alpha_2^{opt}P_T$ and the transmit power $P_2=(1-\alpha_2^{opt})P_T$, the transmit powers $P_1$ and $P_2$ may be calculated separately after the second power allocation factor $\alpha_2^{opt}$ is obtained.

Next, the processing circuit 230 may then obtain the system capacity $C_1$ [based on Equation (4)] and the system capacity $C_2$ [based on Equation (5)] according to the transmit powers $P_1$ and $P_2$ and sum the system capacity $C_1$ and the system capacity $C_2$ to obtain the sum capacity $C_T$.

In brief, the KKT conditions are adopted to obtain the transmit power based on maximizing the sum capacity in the method of power allocation according to embodiments of the disclosure, such that the rate requirement of one user equipment may be preset under different situations to obtain the optimal allocation of the transmit power while maximizing the system capacity of another user equipment.

It should be noted that an extension of the method of power allocation to a MIMO scenario may be described as follows. Denoting a MIMO channel matrix between the base station and an $n^{th}$ user by $H_n$, the singular value decomposition process may be adopted to obtain all the singular values, where the square of each singular value represents an independent subchannel gain. Regarding the MIMO channel as a "big single-input single-output channel" formed by a bundle of all independent subchannels, the effective channel gain may be obtained by computing the sum of all the squared singular values of $H_n$, which is equal to the squared Frobenius norm $\|H_n\|_F^2$. By replacing $|h_1|^2$ and $|h_2|^2$ with $\|H_1\|_F^2$ and $\|H_2\|_F^2$ in Equations (14) and (15), the method of power allocation can be directly applied to a MIMO scenario, where the power allocated to each user is equally distributed among antennas for signal transmission.

Figure 6:
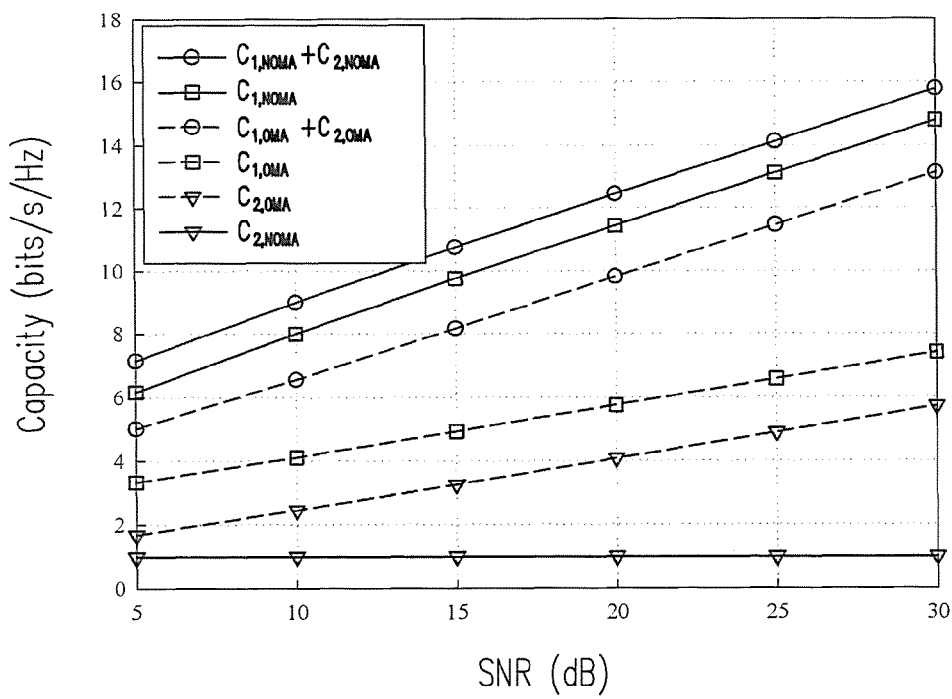
FIG. 6 is a schematic diagram illustrating a simulation result of the system capacity or the sum capacity of the user equipments versus the signal-to-noise ratio (SNR).
Figure 7:
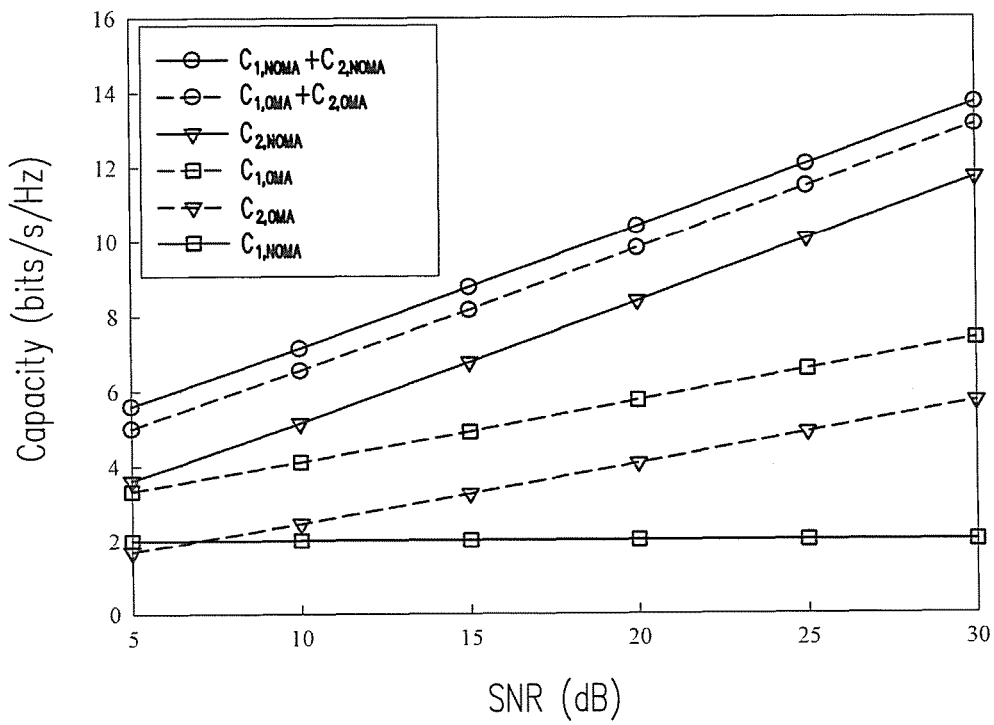
FIG. 7 is a schematic diagram illustrating a simulation result of the system capacity or the sum capacity of the user equipments versus SNR.

FIG. 6 and FIG. 7 are schematic diagrams illustrating simulation results of the system capacity or the sum capacity of the user equipments versus the signal-to-noise ratio (SNR). The simulation results are used to describe the effectiveness of the method of power allocation proposed in the embodiments of the disclosure. In FIG. 6 and FIG. 7, a horizontal axis represents SNR using dB as a unit, and a vertical axis represents the capacity measured using bit per second/Hertz (or bps/Hz) as a unit.

It should be noted that, the simulation results in FIG. 6 and FIG. 7 are obtained by averaging $10^5$ channel realizations. It is adopted the common path-loss model with path-loss exponent $v=3$ for a fading channel, where the variance of the channel fading coefficient $h_{n,\ n\in\{1,2\}}$, from the base station to user equipment (with distance $d_n$) is normalized to be unity for unit reference distance, i.e., $\sigma_{h_n}^2=d_n^{-v}$. The AWGN for each user equipment has unit variance (i.e., $N_0=1$), and the SNR is defined as $P_T/N_0$. For the purpose of performance comparison, $\sigma_{h_1}^2/N_0$ is set to be 20 dB and $\sigma_{h_2}^2/N_0$ is set to be 10 dB, where the user equipment 121 (or the strong user) is closer to the base station 110 than the user equipment 122 (or the weak user). According to the NOMA principle, the larger the channel gain difference $|h_1|^2-|h_2|^2$ between the user equipment 121 and 122, the better the system performance. In other words, it would be better to pair/schedule a user closer to the base station and another user farther from the base station together for NOMA transmission.

In both FIG. 6 and FIG. 7, a system capacity of an orthogonal multiple access (OMA) system is adopted to compare with that of the present disclosure, where the system capacity of an $n^{th}$ user equipment may be written as $C_{n,OMA}=(1/2)\log_2(1+(P_{n,OMA}|h_n|^2)/(1/2)N_0)$. Further, a transmit power $P_{n,OMA}$ in the OMA system achieves maximizing the system capacity and the constraints of the user power and the rate requirement by adopting a Full-Search method. Solid lines are used to represent the method of power allocation for the NOMA system proposed in the embodiments of the disclosure, and dotted lines are used to represent the method of power allocation for the OMA system with the use of the Full-Search method. In each of the two methods of power allocation, it is assumed that the minimum rate requirement $\tilde{C}_2$ is 1 bps/Hz and the minimum rate requirement $\tilde{C}_1$ is 2 bps/Hz and the two methods are applied in the single-antenna system. $C_{1,NOMA}$ and $C_{2,NOMA}$ are used to denote the system capacities of the strong user and the weak user in the NOMA system in the embodiments of the disclosure, respectively. Similarly, $C_{1,OMA}$ and $C_{2,OMA}$ are used to denote the system capacities of the strong user and the weak user in the OMA system in the embodiments of the disclosure, respectively.

Referring to FIG. 6, the simulation result shows that each $C_{2,NOMA}$ meets the minimum rate requirement $\tilde{C}_2$, which is 1 bps/Hz. Despite $C_{2,NOMA}$ is less than $C_{2,OMA}$, the sum capacity of the NOMA system is greater than the sum capacity of the OMA system (i.e., $C_{1,NOMA}+C_{2,NOMA}>C_{1,OMA}+C_{2,OMA}$) since $C_{1,NOMA}$ is greater than $C_{1,OMA}$. Similarly, referring to FIG. 7, the simulation result shows that each $C_{1,NOMA}$ meets the minimum rate requirement $\tilde{C}_1$, which is 2 bps/Hz and $C_{2,NOMA}$ is far greater than $C_{2,OMA}$ (i.e., the system capacity of the weak user in the NOMA system is significantly increased), and thus the sum capacity of the NOMA system is greater than the sum capacity of the OMA system (i.e., $C_{1,NOMA}+C_{2,NOMA}>C_{1,OMA}+C_{2,OMA}$).

Figure 8:
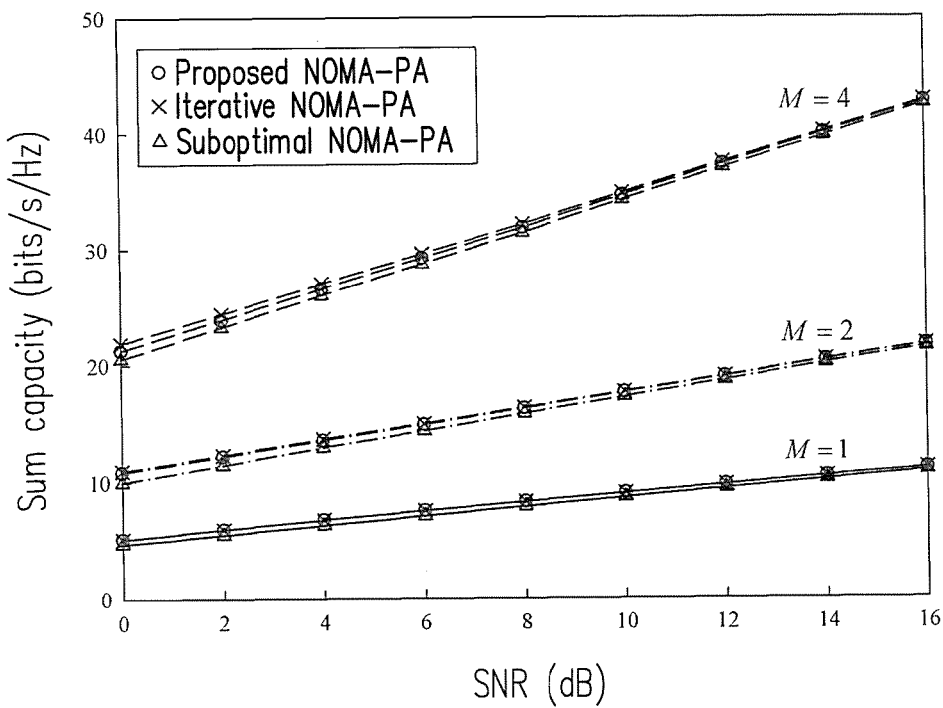
FIG. 8 is a schematic diagram illustrating a simulation result of the sum capacity versus the SNR using different methods of power allocation with different numbers of antennas.

On the other hand, FIG. 8 a schematic diagram illustrating a simulation result of the sum capacity versus the SNR using different methods of power allocation in the MIMO NOMA system. In FIG. 8, the method of power allocation proposed in the embodiments of the present disclosure is compared with the iterative algorithm and the low-complexity suboptimal power allocation mentioned in the prior art. Referring to FIG. 8, a symbol "∘" is used to denote the method of power allocation proposed in the embodiments of the present disclosure (i.e., Proposed NOMA-PA); a symbol "x" is used to denote the method of power allocation that adopts the iterative algorithm (i.e., Iterative NOMA-PA); and a symbol "Δ" is used to denote the suboptimal power allocation (i.e., Suboptimal NOMA-PA). In addition, M is used to denote a number of antennas. The simulation result shows that the method proposed in the embodiments of the disclosure can achieve a higher performance than the suboptimal power allocation and can achieve the system capacity similar to that of the iterative algorithm.

In addition, with respect to the comparison between complexities, the numbers of floating point operations (flops) are respectively evaluated in the present disclosure and the related methods. It is assumed that the numbers of antennas equipped at the base station and at each user equipment are $N_T$ and $N_R$, respectively and the length of transmit symbols would denote $M=\min(N_T,N_R)$. In the present disclosure, the numbers of flops for calculating Equation (11) and (12) are 5 and 9, respectively. Hence, a MIMO scenario need $2N_RN_T+4$ and $2N_RN_T+8$ flops. When denoting N as the iteration number, the iterative algorithm needs $N(^{35}/_3M^3-4M^2+M)$ flops to find the optimal solution. Also, the suboptimal approach requires $^8/_3M^3-M^2+8$ flops to find the optimal solution. Accordingly, it shows that the present disclosure has much lower computational complexity than the related works.

In summary, according to the method of power allocation and the base station using the method in embodiments of the disclosure, the base station can divide the power allocation for the user equipments into two conditions in response to the minimum rate requirements of the different user equipments. That is to say, the minimum rate requirement of one user equipment may be preset to obtain the optimal allocation for the transmit power while maximizing the system capacity of another user equipment. Other than that, in addition to the result of the method proposed in the embodiments of the present disclosure showing the lower computational complexity as compared to the iterative algorithm, the simulation result also indicates that their performances are very close.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A method of power allocation, applicable to a base station for transmitting information signals to at least two user equipments in a non-orthogonal multiple access (NOMA) system, wherein the at least two user equipments comprise a first user equipment and a second user equipment, and the method comprises:

setting a first transmit power of the first user equipment to be smaller than a second transmit power of the second user equipment, wherein a channel gain of the first user equipment is larger than a channel gain of the second user equipment;

calculating a first system capacity of the first user equipment according to the first transmit power, and calculating a second system capacity of the second user equipment according to the second transmit power;

summing the first system capacity and the second system capacity to obtain a sum capacity;

calculating the first transmit power and the second transmit power based on maximizing the sum capacity, wherein Karush-Kuhn-Tucker (KKT) conditions are adopted to obtain the first transmit power and the second transmit power based on maximizing the sum capacity, which comprises: setting the first system capacity to be a first minimum rate requirement, wherein the first minimum rate requirement is a minimum value to be reached by the first system capacity; calculating a first power allocation factor based on maximizing the sum capacity by adopting the KKT conditions; and calculating the first transmit power and the second transmit power according to the first power allocation factor; and transmitting a superimposed signal to the first user equipment and the second user equipment, wherein the superimposed signal comprises a first signal allocated with the calculated first transmit power for the first user equipment and a second signal allocated with the calculated second transmit power for the second user equipment.

2. The method of power allocation according to claim 1, wherein the KKT conditions comprise a first parameter and a second parameter, wherein the step of calculating the first power allocation factor based on maximizing the sum capacity by adopting the KKT conditions further comprises:

setting the first parameter to be greater than zero, and setting the second parameter to be zero; and calculating the first power allocation factor based on maximizing the sum capacity according to the KKT conditions.

3. The method of power allocation according to claim 1, further comprising:

calculating the first system capacity and the second system capacity according to the first transmit power and the second transmit power; and summing the first system capacity and the second system capacity to obtain the sum capacity.

4. A method of power allocation, applicable to a base station for transmitting information signals to at least two user equipments in a non-orthogonal multiple access (NOMA) system, wherein the at least two user equipments comprise a first user equipment and a second user equipment, and the method comprises:

setting a first transmit power of the first user equipment to be smaller than a second transmit power of the second user equipment, wherein a channel gain of the first user equipment is larger than a channel gain of the second user equipment;

calculating a first system capacity of the first user equipment according to the first transmit power, and calculating a second system capacity of the second user equipment according to the second transmit power;

summing the first system capacity and the second system capacity to obtain a sum capacity;

calculating the first transmit power and the second transmit power based on maximizing the sum capacity, wherein Karush-Kuhn-Tucker (KKT) conditions are adopted to obtain the first transmit power and the second transmit power based on maximizing the sum capacity, which comprises: setting the second system capacity to be a second minimum rate requirement, wherein the second minimum rate requirement is a minimum value to be reached by the second system capacity; calculating a second power allocation factor based on maximizing the sum capacity by adopting the KKT conditions; and calculating the first transmit power and the second transmit power according to the second power allocation factor; and transmitting a superimposed signal to the first user equipment and the second user equipment, wherein the superimposed signal comprises a first signal allocated with the calculated first transmit power for the first user equipment and a second signal allocated with the calculated second transmit power for the second user equipment.

5. The method of power allocation according to claim 4, wherein the KKT conditions comprise a first parameter and a second parameter, wherein the step of calculating the second power allocation factor based on maximizing the sum capacity by adopting the KKT conditions further comprises:

setting the first parameter to be zero, and setting the second parameter to be greater than zero; and calculating the second power allocation factor based on maximizing the sum capacity according to the KKT conditions.

6. The method of power allocation according to claim 4, further comprising:
- calculating the first system capacity and the second system capacity according to the first transmit power and the second transmit power; and
- summing the first system capacity and the second system capacity to obtain the sum capacity.

7. A base station, applicable to a non-orthogonal multiple access (NOMA) system, and comprising:
- a transceiver, configured to transmit information signals to at least two user equipments, wherein the at least two user equipments comprise a first user equipment and a second user equipment;
- a storage device, storing a plurality of program codes; and
- a processor, coupled to the transceiver and the storage device, and configured to access the program codes to execute following operations of:
  - setting a first transmit power of the first user equipment to be smaller than a second transmit power of the second user equipment, wherein a channel gain of the first user equipment is larger than a channel gain of the second user equipment;
  - calculating a first system capacity of the first user equipment according to the first transmit power, and calculating a second system capacity of the second user equipment according to the second transmit power;
  - summing the first system capacity and the second system capacity to obtain a sum capacity; and
  - calculating the first transmit power and the second transmit power based on maximizing the sum capacity, wherein Karush-Kuhn-Tucker (KKT) conditions are adopted to obtain the first transmit power and the second transmit power based on maximizing the sum capacity, and wherein the processor is configured to: set the first system capacity to be a first minimum rate requirement, wherein the first minimum rate requirement is a minimum value to be reached by the first system capacity; calculate a first power allocation factor based on maximizing the sum capacity by adopting the KKT conditions; and calculate the first transmit power and the second transmit power according to the first power allocation factor; and
  - controlling the transceiver to transmit a superimposed signal to the first user equipment and the second user equipment, wherein the superimposed signal comprises a first signal allocated with the calculated first transmit power for the first user equipment and a second signal allocated with the calculated second transmit power for the second user equipment.

8. The base station according to claim 7, wherein the KKT conditions comprise a first parameter and a second parameter, and the processor further accesses the program codes to execute operations of:
- setting the first parameter to be greater than zero, and setting the second parameter to be zero; and
- calculating the first power allocation factor based on maximizing the sum capacity according to the KKT conditions.

9. The base station according to claim 7, wherein the processor further accesses the program codes to execute operations of:
- calculating the first system capacity and the second system capacity according to the first transmit power and the second transmit power; and
- summing the first system capacity and the second system capacity to obtain the sum capacity.

10. A base station, applicable to a non-orthogonal multiple access (NOMA) system, and comprising:
- a transceiver, configured to transmit information signals to at least two user equipments, wherein the at least two user equipments comprise a first user equipment and a second user equipment;
- a storage device, storing a plurality of program codes; and
- a processor, coupled to the transceiver and the storage device, and configured to access the program codes to execute following operations of:
  - setting a first transmit power of the first user equipment to be smaller than a second transmit power of the second user equipment, wherein a channel gain of the first user equipment is larger than a channel gain of the second user equipment;
  - calculating a first system capacity of the first user equipment according to the first transmit power, and calculating a second system capacity of the second user equipment according to the second transmit power;
  - summing the first system capacity and the second system capacity to obtain a sum capacity; and
  - calculating the first transmit power and the second transmit power based on maximizing the sum capacity, wherein Karush-Kuhn-Tucker (KKT) conditions are adopted to obtain the first transmit power and the second transmit power based on maximizing the sum capacity, wherein the processor is configured to: set the second system capacity to be a second minimum rate requirement, wherein the second minimum rate requirement is a minimum value to be reached by the second system capacity; calculate a second power allocation factor based on maximizing the sum capacity by adopting the KKT conditions; and calculate the first transmit power and the second transmit power according to the second power allocation factor; and
  - controlling the transceiver to transmit a superimposed signal to the first user equipment and the second user equipment, wherein the superimposed signal comprises a first signal allocated with the calculated first transmit power for the first user equipment and a second signal allocated with the calculated second transmit power for the second user equipment.

11. The base station according to claim 10, wherein the KKT conditions comprise a first parameter and a second parameter, the processor further accesses the program codes to execute operations of:
- setting the first parameter to be zero, and setting the second parameter to be greater than zero; and
- calculating the second power allocation factor based on maximizing the sum capacity according to the KKT conditions.

12. The base station according to claim 10, wherein the processor further accesses the program codes to execute operations of:
- calculating the first system capacity and the second system capacity according to the first transmit power and the second transmit power; and
- summing the first system capacity and the second system capacity to obtain the sum capacity.

* * * * *